United States Patent [19]

Zimmerman

[11] Patent Number: 5,514,834

[45] Date of Patent: May 7, 1996

[54] FLANGED CONDUIT AND INSULATION FOR ELECTRIC WIRES AND METHOD OF USE

[76] Inventor: Harry I. Zimmerman, 150 N. Almont Dr., Apt. 303, Beverly Hills, Calif. 90211

[21] Appl. No.: 130,243

[22] Filed: Oct. 1, 1993

[51] Int. Cl.⁶ ........................................... H02G 3/00
[52] U.S. Cl. ............................. 174/48; 174/70 C
[58] Field of Search ....................... 174/48, 70 C

[56] References Cited

U.S. PATENT DOCUMENTS

| | | | |
|---|---|---|---|
| 1,772,687 | 8/1930 | Reinke | 174/48 X |
| 1,968,596 | 7/1934 | Benander | 174/48 X |
| 1,984,355 | 12/1934 | Abbott | 174/48 |
| 2,157,957 | 5/1939 | Heise et al. | 174/48 |
| 3,253,085 | 5/1966 | Stern | 174/48 X |
| 4,214,414 | 7/1980 | Wendt | 174/48 X |

*Primary Examiner*—Kristine L. Kincaid
*Assistant Examiner*—Michael Cornelison
*Attorney, Agent, or Firm*—Blakely, Sokoloff, Taylor & Zafman

[57] ABSTRACT

Flanged conduit and flanged insulation for anchoring electric wires along a wall and floor is shown for use by inserting the flange into a preexisting gap.

22 Claims, 4 Drawing Sheets

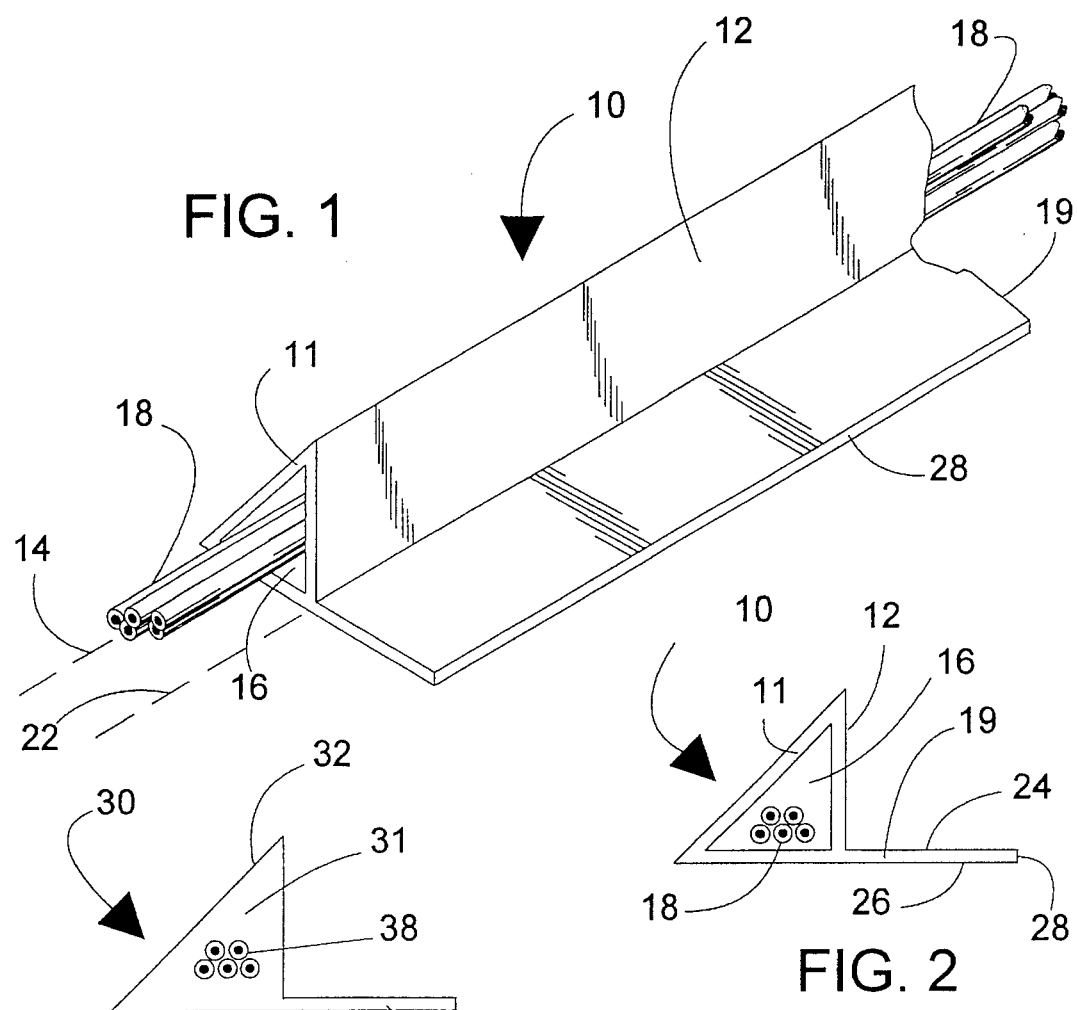
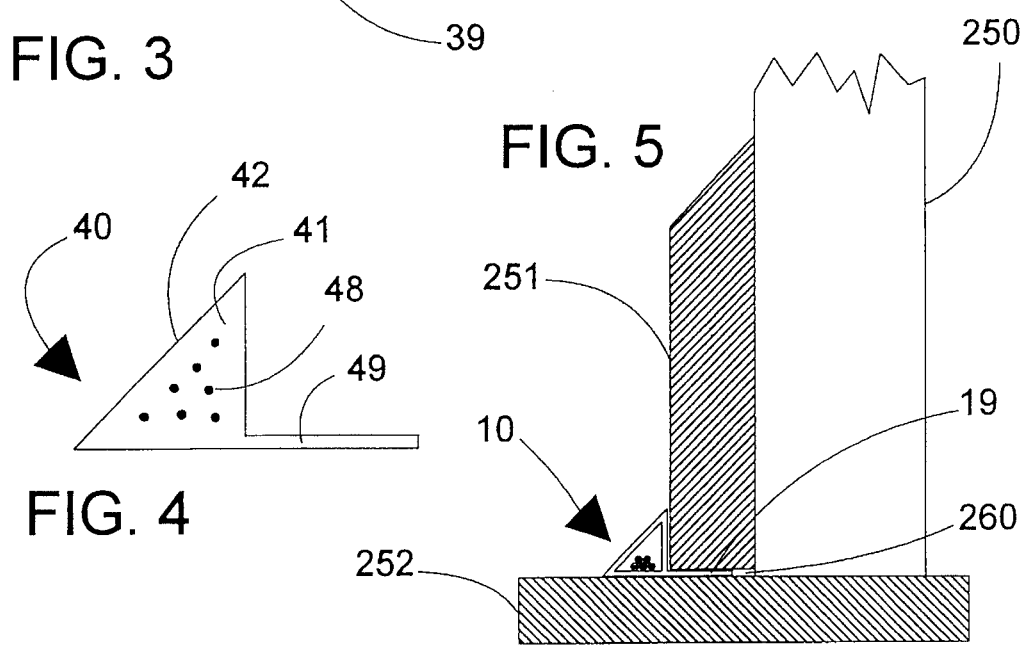

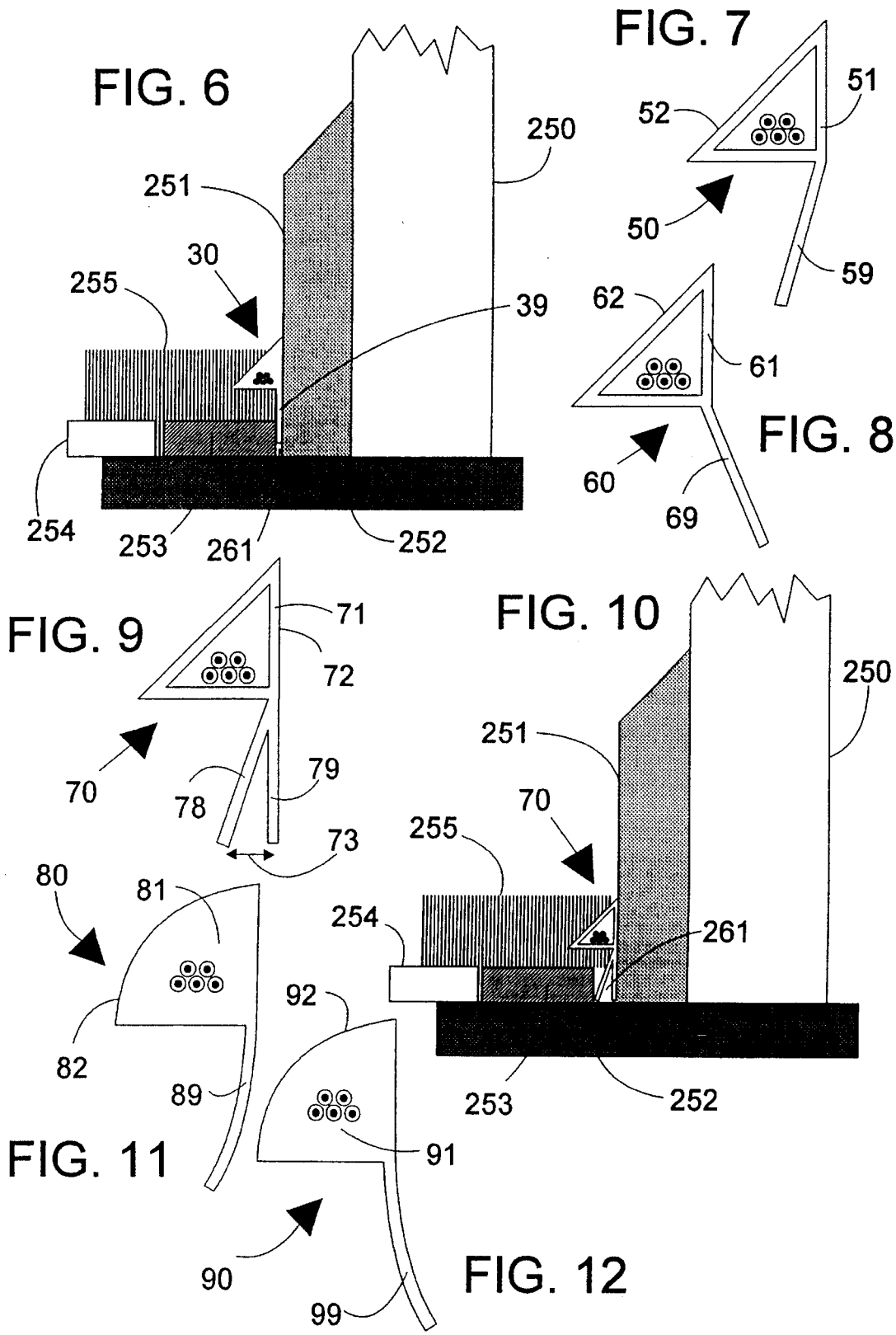

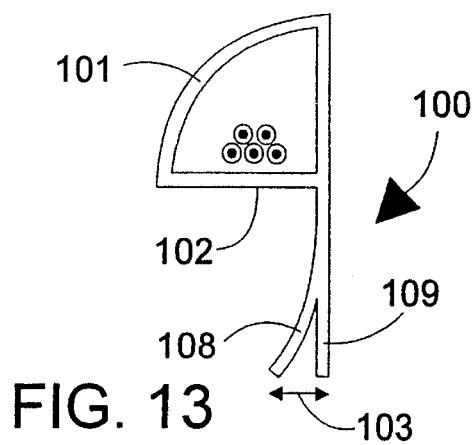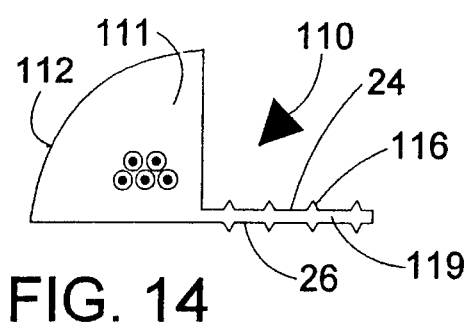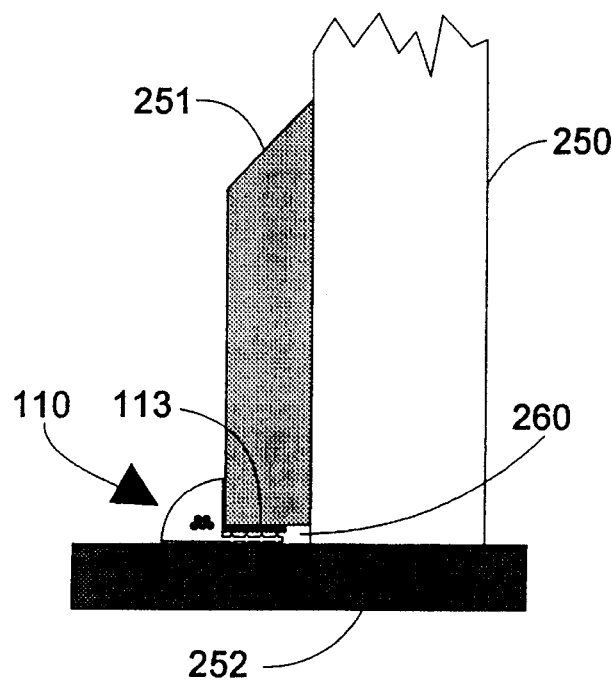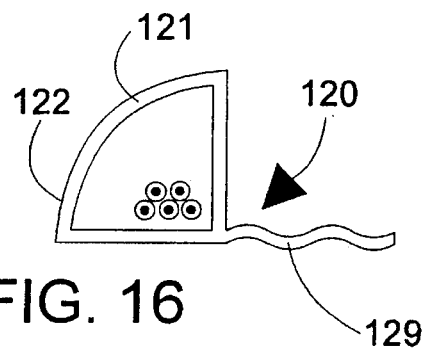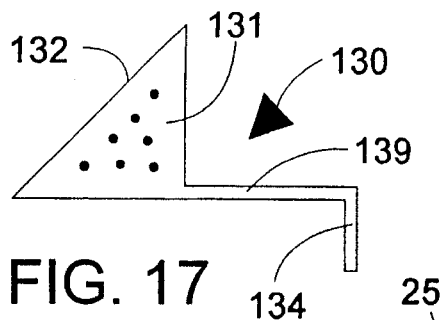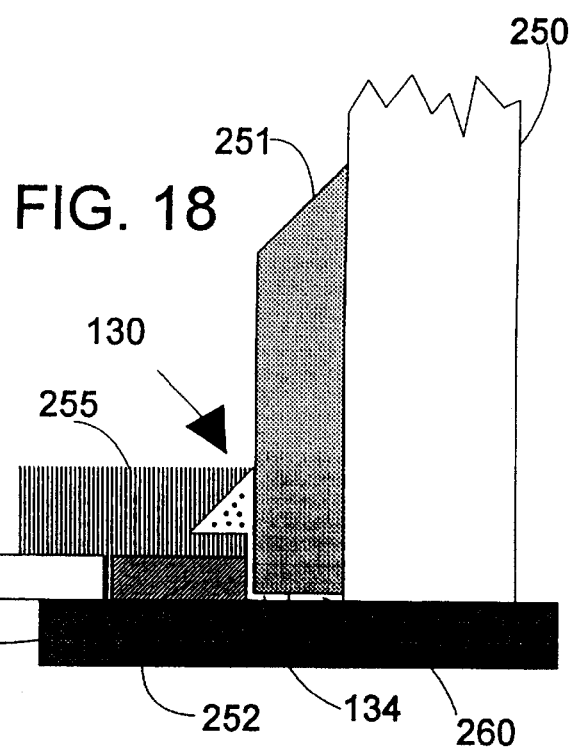

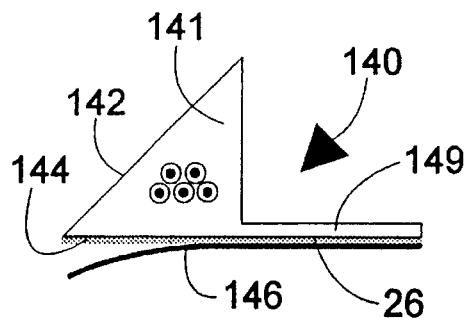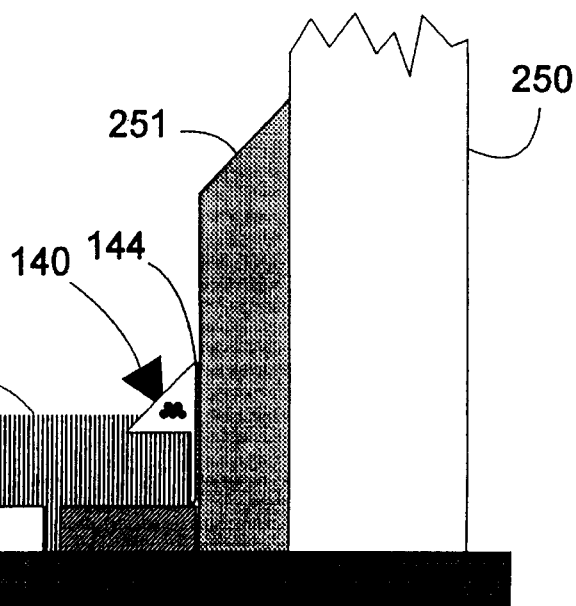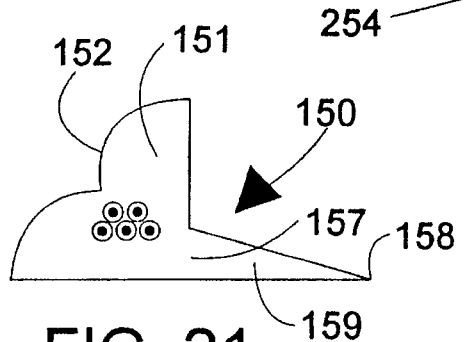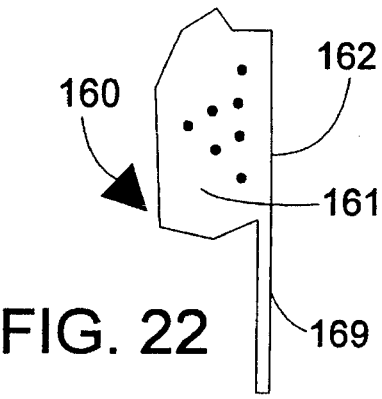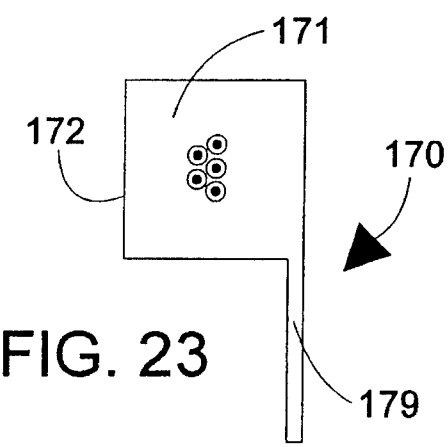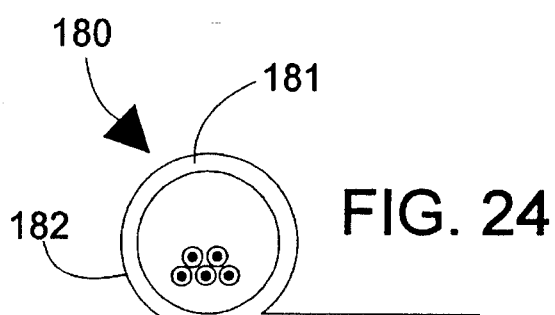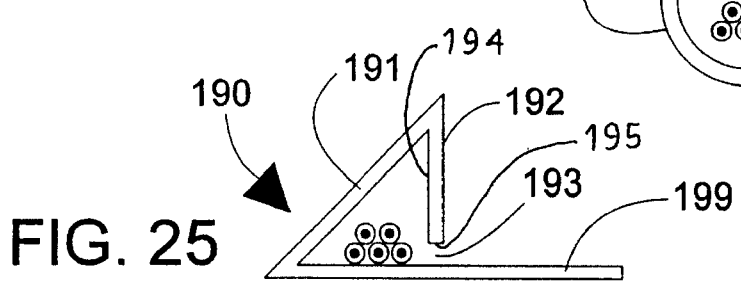

FLANGED CONDUIT AND INSULATION FOR ELECTRIC WIRES AND METHOD OF USE

TECHNICAL FIELD

The present invention pertains to structures and methods for holding electric wires, and more particularly to flanged conduit and flanged insulation for electric wires and methods for anchoring electric wires to walls, baseboards, floors, and moldings along preexisting gaps using the flanged conduit or insulation.

BACKGROUND ART

Conduit for containing, protecting, and routing electric wires and cords along a desired pathway have been known in the art for many years. The conduit is typically fastened to the pathway by various mechanical means such as nails, screws, staples, glue, or adhesive. U.S. Pat. No. 4,258,515 defines an extruded plastic conduit comprising a base strip and a snap on cover strip. The conduit is attached to the desired surface with screws or adhesive. U.S. Pat. No. 4,391,303 describes an extruded plastic band which is bent into a tubular protective covering for wires. It is held in place by glue, staples, or nails. U.S. Pat. No. 4,454,374 discloses an extruded plastic electric cord holder which is attached to the desired surface by an adhesive strip having a protective peel off cover. U.S. Pat. No. 4,530,865 shows a cable protecting device of extruded plastic or rubber designed for laying cables along walls, floors, or furniture. The device is attached by means of an adhesive coating having a peel off backing. U.S. Pat. No. 4,534,147 provides an extruded plastic duct for mounting cables on a wall or ceiling. The duct is fastened in position with adhesive or screws. U.S. Pat. No. 4,563,542 shows an extruded plastic electric cord holder held in place with adhesive material. U.S. Pat. No. 4,723,580 shows a sheet metal raceway for electric cables which is attached to the wall with screws.

Each of the these conduits relies upon mechanical fasteners or adhesive materials to attach the conduit to the desired pathway. This limitation can present problems in those instances where it is not acceptable to deface the pathway with either penetrating holes or adhesive contamination.

DISCLOSURE OF INVENTION

The present invention is directed to flanged conduit and flanged insulation for electric wires and methods for anchoring wires from audio systems, telephones, television, radio, intercoms, security systems, computer systems, loudspeakers, doorbells, electric cords and the like in position along preexisting gaps by forcing the flange into the gaps. The present invention is particularly useful along walls, floors, baseboards, and moldings where narrow gaps are often present.

In accordance with a preferred embodiment of the invention, the flanged conduit has a hollow body into which the wires are inserted. An outwardly projecting flange extends from the body. The flange is wedged into a preexisting gap to hold the conduit and wires in place. No other mechanical or adhesive means is required to hold the conduit and electric wires in position.

In accordance with another preferred embodiment of the invention, the electric wires are embedded in resilient plastic insulation having a flange. The flange of the insulation is pressed into the preexisting gap to hold the wires in place.

In accordance with another important aspect of the invention, the flanged conduit or flanged wire has bent, curved, or waved flanges to enhance the ease of inserting the flanges in preexisting gaps and retaining the wires in place.

In accordance with another important aspect of the invention, two flanges are provided on the flanged conduit or flanged wires at acute angels to each other. The resilient plastic material from which the flanges are fabricated causes them to push apart when they are inserted into a preexisting gap.

In accordance with another important aspect of the invention, a slot is provided between the inner and outer surface of the flanged conduit allowing wires to be inserted and removed from the conduit after it is in place.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a perspective view of a flanged conduit in accordance with the present invention;

FIG. 2 is a left end elevation view;

FIG. 3 is a left end elevation view of a second embodiment of wires having flanged insulation;

FIG. 4 is a left end elevation view of a third embodiment of wires having flanged insulation;

FIG. 5 illustrates the flanged conduit of FIG. 2 installed in a gap with the flange in a horizontal position;

FIG. 6 illustrates the flanged wires of FIG. 3 installed in a gap with the flange in a vertical position;

FIG. 7 is a right end elevation view of a fourth embodiment having a flanged conduit;

FIG. 8 is a right end elevation view of a fifth embodiment having a flanged conduit;

FIG. 9 is a right end elevation view of a sixth embodiment having a flanged conduit;

FIG. 10 illustrates the flanged conduit of FIG. 9 installed in a gap with the flange in a vertical position;

FIG. 11 is a right end elevation view of a seventh embodiment of wires having flanged insulation;

FIG. 12 is a right end elevation view of an eighth embodiment of wires having flanged insulation;

FIG. 13 is a right end elevation view of a ninth embodiment having a flanged conduit;

FIG. 14 is a left end elevation view of a tenth embodiment of wires having flanged insulation;

FIG. 15 illustrates the flanged wires of FIG. 14 installed in a gap with the flange in a horizontal position;

FIG. 16 is a left end elevation view of an eleventh embodiment having a flanged conduit;

FIG. 17 is a left end elevation view of a twelfth embodiment of wires having flanged insulation;

FIG. 18 illustrates the flanged wires of FIG. 17 installed in gaps with the flange in a vertical position and an extension in a horizontal position;

FIG. 19 is a left end elevation view of a thirteenth embodiment of wires having flanged insulation;

FIG. 20 illustrates the flanged wires of FIG. 19 installed on a baseboard;

FIG. 21 is a left end elevation view of a fourteenth embodiment of wires having flanged insulation;

FIG. 22 is a right end elevation view of a fifteenth embodiment of wires having flanged insulation;

FIG. 23 is a right end elevation view of a sixteenth embodiment of wires having flanged insulation;

FIG. 24 is a left end elevation view of a seventeenth embodiment having a flanged conduit; and, FIG. 25 is a left end elevation view of an eighteenth embodiment having a flanged conduit.

MODES FOR CARRYING OUT THE INVENTION

Referring initially to FIGS. 1 and 2, a flanged conduit for electric wires is illustrated in perspective and left end elevation views, in accordance with the present invention, generally designated 10. The conduit is preferably fabricated of a resilient plastic material or metal and has an elongated body 11 for surrounding the wires. The body 11 has an outside surface 12 and an inside surface 13 spaced from the outside surface. The inside surface 13 defines an electric wire receiving cavity 16. One or more electric wires 18 may be inserted in the cavity 16. The cavity may be made larger or smaller to accommodate any number of electric wires 18 or for other installation requirements such as for holding and protecting fiber optics or small pipes.

An outwardly extending elongated longitudinal first flange 19 is provided for anchoring the conduit along a preexisting gap as illustrated in FIGS. 5 and 6. The flange 19 is integrally coupled to the outside surface 12 and has a first surface 24, a second surface 26 spaced from the first surface, and a side 28 opposite the junction with the outside surface 12. The plane of the second surface 26 is substantially the same as the plane of the adjacent side 25 of the body 11. The width and thickness of the flange 19 can be adjusted to accommodate the depth and width of various sized preexisting gaps. The flanged conduit 10 is typically constructed in a continuous length of endless profile of extruded plastic and is then cut into desired shorter lengths by the manufacturer and user. The upper right end of FIG. 1 is broken off to represent an undetermined length. All of the following embodiments are represented in end views only. It should be appreciated that they would all be similar in appearance to FIG. 1 when shown in perspective.

FIG. 3 is a left end elevation view of a second embodiment having wires with flanged insulation, generally designated 30. The insulation 31 on the wires 38 has an outside surface 32 and an outwardly extending first flange 39. This embodiment is fabricated by molding resilient plastic material around wires 38 that have been previously covered with insulation 37.

FIG. 4 is a left end elevation view of a third embodiment having wires with flanged insulation, generally designated 40. The insulation 41 on the wires 48 has an outside surface 42 and an outwardly extending first flange 49. This embodiment is fabricated by molding plastic around bare electric wires. The insulating properties of the plastic material of which the insulation 41 is molded obviate the need to use electric wires which have previously been insulated as shown in FIG. 3.

FIGS. 2, 3, and 4 represent the three primary structural forms of the present invention. All have the same outside appearance and are installed in the same manner. Whether one form is used instead of another is purely a decision of the installer and what type of wire is available. All of the following embodiments may be fabricated in all of these three forms except for the embodiment shown in FIG. 25 and the fact that any one of the following embodiments is shown with a particular one of these three forms does not preclude it from being made in another of these three forms.

FIG. 5 illustrates the use of the flanged conduit 10 of FIG. 2 installed in a preexisting gap 260 with the flange 19 in a horizontal position. A baseboard 251 is attached to a wall 250 perpendicular to the hardwood floor 252 forming the gap 260. When the flange 19 is pressed or otherwise wedged into the gap 260, the conduit 10 is held in position by the friction between the flange 19 and the baseboard 251 and floor 252. Other mechanical or adhesive retaining means are not required. The resultant appearance is of a finished, attractive uniform conduit along the wall instead of unsightly wires laid along the floor.

The conduit 10 is typically used to continuously anchor a length of electric wire securely in position along a predetermined pathway. Alternatively, shorter sections of the conduit may be utilized to intermittently anchor wires to the desired pathway. This method would be used where it is inconvenient to use the conduit such as where doorways, furniture, or equipment make other methods of the holding the wires necessary.

FIG. 6 illustrates the flanged wires 30 of FIG. 3 installed in a gap with the flange 39 in a vertical position. A carpet tack strip 253 is attached to the floor 252 creating a gap 261 between the carpet tack strip 253 and the baseboard 251. A carpet pad 254 is laid on the floor 252. Carpet 255 is attached to the carpet tack strip 253. The flange 39 is vertically inserted into the gap 261 between the carpet tack strip 253 and the baseboard 251. The force of gravity on the flanged wire 30 and friction between the flange 39 and the carpet 255, the carpet tack strip 253, and the baseboard 251 are sufficient to retain the flanged wire in position without the need to employ other mechanical or adhesive retaining means.

It should be appreciated that while FIG. 5 illustrates the use of the embodiment of FIG. 2 and FIG. 6 illustrates the use of the embodiment of FIG. 3, any of the embodiments of FIGS. 2, 3, or 4 could have been used in the applications of FIGS. 5 and 6 with equal results and appearances.

FIG. 7 is a right end elevation view of a fourth embodiment of the flanged conduit, generally designated 50. The conduit 50 has an elongated body 51, an outside surface 52, and an outwardly extending first flange 59. The first flange 59 is rotated clockwise a predetermined angle around the second axis 22 (FIG. 1).

FIG. 8 is a right end elevation view of a fifth embodiment of the flanged conduit, generally designated 60. The conduit 60 has an elongated body 61, an outside surface 62, and an outwardly extending first flange 69. The first flange 69 is rotated counterclockwise a predetermined angle around the second axis 22 (FIG. 1). The rotation of the flanges as shown in FIGS. 7 and 8 facilitates the insertion of the flanges into some preexisting gaps and increases the friction between the conduit and supporting structure in certain applications.

FIG. 9 is a right end elevation view of a sixth embodiment of the flanged conduit, generally designated 70. The conduit 70 has an elongated body 71, an outside surface 72, an outwardly extending first flange 79, and an outwardly extending second flange 78. The first and second flanges 79, 78 are joined to the body at an acute angle to each other. When the first and second flanges 79, 78 are forced together, the resiliency of the plastic material from which they are molded causes them to move apart in the direction of the double arrow 73 when they are released causing the flanges to exert continuous pressure on the walls of a gap.

FIG. 10 illustrates the flanged conduit 70 of FIG. 9 installed in a gap 261 with the flanges in a vertical position. In order to install the conduit, the first and second flanges 79, 78 (FIG. 9) are pushed together with a tool as the flanges are vertically inserted into the gap 261. When the tool is removed, the flanges spring out and exert pressure on the carpet tack strip 253 and the baseboard 251 thereby anchoring the conduit 70 in position.

FIG. 11 is a right end elevation view of a seventh embodiment having wires with flanged insulation, generally designated 80. The insulation 81 has an outside surface 82 and an outwardly extending first flange 89. The flange 89 is curved by a predetermined amount in a clockwise direction.

FIG. 12 is a right end elevation view of an eighth embodiment having wires with flanged insulation, generally designated 90. The insulation 91 has an outside surface 92 and an outwardly extending first flange 99. The flange 99 is curved by a predetermined amount in a counterclockwise direction. The curving of the flanges in FIGS. 11 and 12 facilitates the insertion of the flanges into some preexisting gaps and increases the friction between the conduit and supporting structure in certain applications.

FIG. 13 is a right end elevation view of a ninth embodiment having wires with flanged insulation, generally designated 100. The flanged insulation 101 has an outside surface 102, an outwardly extending first flange 109, and an outwardly extending curved second flange 108. The first and second flanges 109, 108 are joined at an acute angle to each other. When the first and second flanges 109, 108 are forced together, the resiliency of the plastic material from which they are molded causes them to move apart in the direction of the double arrow 103 when they are released causing the flanges to exert continuous pressure on the walls of a gap.

FIG. 14 is a left end elevation view of a tenth embodiment of wires having flanged insulation, generally designated 110. The flanged insulation 111 has an outside surface 112 and an outwardly extending first flange 119. Outwardly projecting longitudinal ribs 116 are integrally molded to both the first and second surfaces 24, 26 of the flange. The ribs aid in retaining the flange in position in certain applications.

FIG. 15 illustrates the flanged wires of FIG. 14 installed in a gap 260 with the flange 119 (FIG. 14) in a horizontal position. A shim 113 is placed on top of the flange 119 to fill up part of the gap 260 between the baseboard 251 and hardwood floor 252. The thickness of the shim is selected so that the combined thickness of the shim and flange firmly wedge the flange between the baseboard and the floor.

FIG. 16 is a left end elevation view of an eleventh embodiment of the flanged conduit, generally designated 120. The flanged conduit 120 has an elongated body 121, an outside surface 122, and an outwardly extending first flange 129. The flange 129 is molded with longitudinal undulating wave shaped crests and troughs. When the flange 129 is inserted into a gap, the crests and troughs of the waves are pressed toward each other. The resilience of the plastic material from which the conduit is fabricated causes the crests and troughs to push outward and firmly engage the walls of the gap.

FIG. 17 is a left end elevation view of a twelfth embodiment having wires with flanged insulation, generally designated 130. The flanged insulation 131 has an outside surface 132, an outwardly extending first flange 139, and an extension 134 integrally molded with the first flange 139 and perpendicular to it. The lengths of the first flange 139 and extension 134 can be modified to accommodate specific installation requirements. The purpose of the extension is to catch under suitable structure during installation.

FIG. 18 illustrates the flanged wires of FIG. 17 installed in gaps with the flange in a vertical position and the extension in a horizontal position. The extension 134 and first flange 139 (FIG. 17) are pressed down into the gap 260 along the baseboard 251 until the extension passes horizontally under the baseboard thereby anchoring the flanged wires 130 in position.

FIG. 19 is a left end elevation view of a thirteenth embodiment of wires having flanged insulation, generally designated 140. The insulation 141 has an outside surface 142 and an outwardly extending first flange 149. An adhesive strip 144 with a protective covering 146 is attached to the second surface 26 of the first flange 149.

FIG. 20 illustrates the flanged wires 140 of FIG. 19 installed on the baseboard 251. After the covering 146 (FIG. 19) is removed, the flanged wires 140 are pressed against the baseboard 251 to attach the flanged wires to the baseboard.

FIGS. 21–24 illustrate various additional outside surface appearances for the flanged conduit and wire which are in addition to the single flat and curved surfaces of the previous embodiments. Any other outside surface can be fabricated to create a desired appearance so that the finished appearance of the flanged conduit or wires installed in place appears to be part of the molding or baseboard.

FIG. 21 is a left end elevation view of a fourteenth embodiment of wires having flanged insulation, generally designated 150. The insulation 151 has an outside surface 152 and an outwardly extending first flange 159. The outside surface 152 has two curved surface segments and two straight surface segments. The flange 159 is shaped in the form of a wedge having a pointed end 158 and a blunt end 157. The wedge shape of the flange 159 allows the flange 159 to be secured in narrow gap widths dependent upon how far the flange is forcibly pressed into the gap.

FIG. 22 is a right end elevation view of a fifteenth embodiment of wires having flanged insulation, generally designated 160. The flanged insulation 161 has an outside surface 162 and an outwardly extending first flange 169. The outside surface 162 is irregular in profile and has a plurality of surface segments.

FIG. 23 is a right end elevation view of a sixteenth embodiment of wires having flanged insulation, generally designated 170. The insulation 171 has an outside surface 172 and an outwardly extending first flange 179. The outside surface 172 is rectangular in profile.

FIG. 24 is a left end elevation view of a seventeenth embodiment of the flanged conduit, generally designated 180. The flanged conduit 180 has an elongated body 181, an outside surface 182, and an outwardly extending first flange 189. The outside surface 182 is elliptical in profile.

FIG. 25 is a left end elevation view of an eighteenth embodiment of the flanged conduit, generally designated 190. The flanged conduit 190 has an elongated body 191, an outside surface 192, an inside surface 194 spaced from the outside surface, and an outwardly extending first flange 199. Slot walls 195 between the inside and outside surfaces define a longitudinal slot 193 allowing electric wires to be conveniently inserted into or removed from the conduit from the side instead of the ends as in the previous embodiments.

The preferred embodiments of the invention described herein are exemplary and numerous modifications, dimensional variations and rearrangements can be readily envisioned to achieve an equivalent result, all of which are intended to be embraced within the scope of the appended claims.

I claim:

1. A flanged conduit adapted to be installed using an existing gap between a wall, a molding or baseboard affixed to the wall and a floor covering comprising:

an elongated body having: an outside surface; and, an inside surface spaced from said outside surface defining a cavity; and, an outwardly extending elongated longitudinal first flange coupled to said outside surface, said first flange having a length the same as the length of the elongated body and a width dimensioned so that when said flange is inserted in said existing gap, said flange is not visible and said conduit lies substantially flush against said wall, molding or baseboard affixed to the wall and the floor covering.

2. A flanged conduit according to claim 1, wherein said first flange is curved.

3. A flanged conduit according to claim 1, wherein said first flange has longitudinal undulating wave shaped crests and troughs.

4. A flanged conduit according to claim 1, wherein said first flange further comprises outwardly projecting longitudinal ribs.

5. A flanged conduit according to claim 1, wherein said first flange is wedge shaped.

6. A flanged conduit according to claim 1, further comprising a second flange coupled to said body and forming an acute angle with said first flange.

7. A flanged conduit according to claim 1, further comprising a substantially perpendicular extension coupled to said first flange.

8. A flanged conduit according to claim 1, further comprising an adhesive strip coupled to said first flange.

9. A flanged conduit according to claim 1, further comprising slot walls between said outside and inside surfaces defining a slot.

10. A flanged conduit according to claim 1, wherein said flanged conduit is fabricated of resilient plastic material.

11. A flanged conduit according to claim 1, wherein:

said first flange has a first side and a second side spaced from said first side;

said outside surface has an adjacent side; and, the plane of said second side is substantially the same as the plane of said adjacent side.

12. Electric wires having flanged insulation, comprising: electric wires; flanged insulation surrounding said electric wires fabricated of resilient plastic material and having: an elongated body having an outside surface; and, an outwardly extending elongated longitudinal first flange coupled to said outside surface, said flanged insulation adapted to be installed using an existing gap between a wall, a molding or baseboard affixed to the wall and a floor covering, said flange having a length the same as the length of the elongated body and a width dimensioned so that when said flange is inserted in said gap, said flange is not visible and said flanged insulation lies substantially flush against said wall, molding or baseboard affixed to the wall and the floor covering.

13. Electric wires having flanged insulation in accordance with claim 12, wherein said first flange is curved.

14. Electric wires having flanged insulation in accordance with claim 12, wherein said first flange has longitudinal undulating wave shaped crests and troughs.

15. Electric wires having flanged insulation in accordance with claim 12, wherein said first flange further comprises outwardly projecting longitudinal ribs.

16. Electric wires having flanged insulation in accordance with claim 12, wherein said flange is wedge shaped.

17. Electric wires having flanged insulation in accordance with claim 12, further comprising a second flange coupled to said body and forming an acute angle with said first flange.

18. Electric wires having flanged insulation in accordance with claim 12, further comprising a substantially perpendicular extension coupled to said first flange.

19. Electric wires having flanged insulation in accordance with claim 12, further comprising an adhesive strip coupled to said first flange.

20. Electric wires having flanged insulation in accordance with claim 12 wherein:

said first flange has a first side and a second side spaced from said first side;

said outside surface has an adjacent side; and, the plane of said second side is substantially the same as the plane of said adjacent side.

21. A method for holding electric wires along a preexisting gap between a wall, a molding or baseboard affixed to the wall and a floor covering comprising the steps of: providing a flanged conduit having a body and a flange, said flange having a length the same as the length of the body and a width dimensioned so that when said flange is inserted into said preexisting gap, said flange is not visible and said conduit lies substantially flush against said wall, molding or baseboard affixed to the wall and the floor covering; inserting electric wires into said body; and inserting said flange into said gap.

22. A method for holding electric wires along a preexisting gap between a wall, a molding or baseboard affixed to the wall and a floor covering comprising the steps of: molding resilient plastic material around said electric wires in a profile having a body containing said wires and an outwardly extending flange, said flange having a length the same as the length of the body and a width dimensioned so that when said flange is inserted into said preexisting gap, said flange is not visible and said resilient plastic material lies substantially flush against said wall, molding or baseboard affixed to the wall and the floor covering; and, inserting said flange into said gap.

* * * * *